United States Patent [19]

Austin

[11] 4,141,273
[45] Feb. 27, 1979

[54] MUSIC LEARNING AID

[76] Inventor: Benjamin Austin, 1567 Mistletoe Dr., Cleveland, Ohio 44106

[21] Appl. No.: 869,689

[22] Filed: Jan. 16, 1978

[51] Int. Cl.² .............................................. G04F 5/02
[52] U.S. Cl. .................................................... 84/484
[58] Field of Search ..................... 84/453, 464, 470 R, 84/477 R, 484

[56] References Cited

U.S. PATENT DOCUMENTS

| | | | |
|---|---|---|---|
| 2,223,668 | 12/1940 | Nicola | 84/484 |
| 3,467,959 | 9/1969 | Zazofsky | 84/484 X |
| 3,541,916 | 11/1970 | Reid | 84/484 |
| 3,771,407 | 11/1973 | Leonard | 84/484 |

Primary Examiner—Lawrence R. Franklin
Attorney, Agent, or Firm—Teare, Teare & Sammon

[57] ABSTRACT

A device is provided for learning and practicing a musical beat. A foot pedal is adjustably connected by linkages and springs to actuate switches to produce one signal when the pedal is at a selected downward position and another signal when the pedal is at a selected upward position. Visual readout means located adjacent the sheet music used by a player receives the signal and flashes one kind of light adjacent the music when the pedal has reached its upbeat, and another kind of light adjacent the music when the pedal has reached its down beat. The pedal is rotatably adjustable to accommodate all methods of keeping time with the foot.

12 Claims, 10 Drawing Figures

MUSIC LEARNING AID

BACKGROUND OF THE INVENTION

The present invention relates to a device for teaching the reading and playing of music, and more particularly, to a device for an aid in teaching a student to play "on beat".

One of the most difficult aspects of music relates to playing "on beat". This is a problem in playing all instruments, whether a melody instrument, such as a clarinet or trumpet, or a rhythm instrument, such as a bass or drum.

A musical beat relates to the timing of notes. In order for two or more musicians to play a piece of music in a harmonious and coherent manner, each must play the notes designated for his instrument at the precise instant in time set forth in the sheet music or designated by the musical director. Moreover, even when a musician plays solo, he must follow the beat for each melody note, to avoid distortion, and even loss of recognizability of the tune.

A song or other musical piece is divided time-wise into a series of sections of equal time periods called measures or bars. Each measure, in turn, is divided into a series of equally spaced time intervals of alternating "upbeats" and "downbeats". A conventional method for a musician to "keep time" is to move his foot up and down in a regular rhythm. Each time his foot taps the floor, a "downbeat" is said to occur. Each time his foot reaches an apex before returning for the next downbeat, an "upbeat" is said to occur.

A composer or arranger uses conventionally recognizable symbols to indicate to each musician when he is to play each note relative to the downbeat and upbeat. For example, the conventional symbols would indicate whether a note is to be played on a particular downbeat or on a particular upbeat, or at what point in time it is to be played between such beats.

Accordingly, in attempting to play "on beat", a musician reads the timing symbols for a note and then tries to play the note at the precise time indicated in the music. However, until the student is so proficient at reading music that he is said to be a "sight reader", he must slowly analyze each measure of written music to determine when each note is played relative to the up and down beats. Because much modern music, whether rock and roll or jazz, as well as classical music, such as symphonic or the like, has extremely complicated timing, it is very difficult to learn when a note is to be played relative to the downbeat or upbeat. For example, in so-called syncopation, a note that is to be sustained for one or more beats might begin on an upbeat rather than on a downbeat. This is very confusing to a beginner. Moreover, an even greater difficulty occurs in trying to apply such timing to an actual playing situation. The beginning musician has great problems in coordinating what he reads with the actual playing of the instrument.

Because of the aforesaid problems, it is difficult for a student to comprehend what a teacher is trying to teach concerning "beat", and even more difficult to put such concepts into practice. Moreover, even when the student believes that he understands the beat, it is difficult for him to test himself to be certain that he is producing the beat according to his understanding.

Furthermore, because of the difficulty involved, a student takes a far longer time than is desirable to learn how to play on beat. Moreover, because the learning process is so frustrating, the student often loses interest, and as a result fails to give the effort necessary to learn to play in a proper beat.

STATEMENT OF THE INVENTION

In accordance with one aspect of the present invention, a foot pedal device translates foot movement into electrical signals which, in turn, are transferred into different colored and spaced apart light signals displayed adjacent the written music being read by the student. By such arrangement, the present invention provides a device to aid a student in comprehending the "beat" aspect of written music and coordinating the playing of the music with the written notation. A device is provided which not only assists in successful "beat" analysis of a piece of music but also assists the student in increasing the speed of his learning and in determining whether he is properly playing the notes pursuant to the analysis. Equally important, the device provides a stimulant to learning that sustains the student's interest and reinforces his sense of accomplishment.

It was found that the provision of a visual signal adjacent the music of the up and down beat produced by the foot provided a method of learning that was far superior to the use of the foot alone. In other words, in accordance with the present invention, a tactile or "feeling" sense provided by the foot is translated into a visual sensation displayed adjacent the visual representation provided by the sheet music. It has been found that such visual juxtaposition of the music and the up and down beat remarkably increases learning and sustains the student's interest, as well as providing an improved method of checking his progress.

A further object of the invention is to provide a device having the aforesaid advantages, but which does not place an unnecessary strain on the user, and accordingly does not require the user to depart from his natural method of keeping time with his foot. As a result, the user does not need to develop an awkward, rigid or unnatural means of moving his foot. Consequently, the device becomes an aid which one can readily use, rather than being an artificial and cumbersome contraption. Thus, the device is an inducement rather than a hindrance to learning, and is a device that one readily accepts.

Still another object of the invention is to provide a learning device which will enable the user to make a smooth transition from the use of the device to the conventional method of keeping time, i.e., by the use of the foot alone, which is one of the methods eventually used by accomplished musicians.

Another object of the invention is to provide a device which could be used by a musician irrespective of the "way" that he naturally keeps time with his foot. For example, one musician might stop the "downbeat" short of actually touching the floor, and accordingly the device must allow for such variation. Even more important is that everyone has a different distance of foot movement for the "upbeat". Since the upward movement of the foot is determined by the size of one's foot, one's muscular structure, and one's "feel" as to what is the uppermost motion for him, there is no standard height distance. To complicate matters even further, some persons desire to keep time by "rocking" their foot from side to side rather than using the conventional toe tap. In addition, some musicians keep time by tapping their toe rather than their heel. From the foregoing, it can be seen that there was a problem in developing a device which would provide the output signal representative of the downbeat and upbeat of the foot irrespective of the nature of the foot movement or degree of foot movement which is natural to the particular musician.

Accordingly, an object of the invention is to produce a device that will accurately determine what is the upbeat and downbeat for each musician. A further object is to provide such a device by a structure which will not be too expensive to produce.

In accordance with the foregoing objectives, the student keeps "time" on a rotatably positionable hinged pedal acting in conjunction with position responsive adjustable switching means to provide output signals at selective downward and upward movement of the pedal at its selective rotative position to produce flashes of lights adjacent to the sheet music corresponding to the down and up beat of the foot.

DESCRIPTION OF THE PREFERRED EMBODIMENTS

Figure 1:
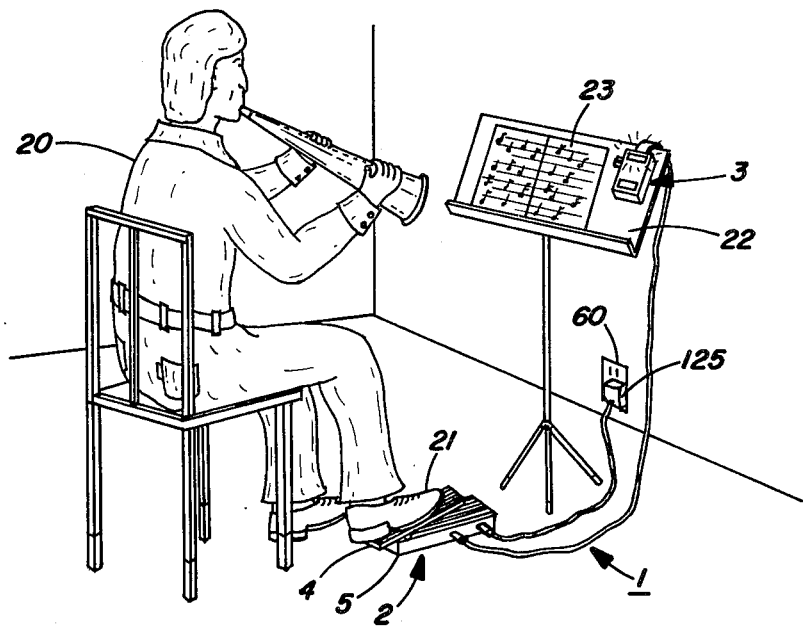
FIG. 1 is a generally perspective view of a student utilizing a device in accordance with the present invention.

FIG. 1 illustrates the device 1 for learning to play a musical beat in accordance with the present invention. The device 1 includes a foot pedal actuated, electric signal producing assembly shown generally at 2. The assembly includes a foot pedal 4 which is hingeably and spring mounted on a turn table 12 (FIG. 4) carried by a foot pedal support structure shown generally at 5. By such arrangement, the pedal is adjustable to the heel, sides or toe of the foot 21 of a student 20 (FIG. 1) and, once adjusted, moves up and down in response to the student's corresponding foot movement. A follower pin 15 (FIG. 4) passes through the cover 14 of the foot pedal support structure 5 and rides on follower spring 17 whereby follower pin 15 moves downward and upwardly proportional to the corresponding movement of pedal 4. Follower spring 17 carries one switch closing arm 18 and is connected by a rocker arrangement to another switch closing arm 19. Accordingly, arm 18 moves in the same direction as spring 17, and arm 19 moves in the opposite direction. Switches 8 and 9 depend from cover 14 of pedal support structure 5 a selected distance from arms 18 and 19. By such arrangement, switch 8 is closed by arm 18 when pedal 4 is at its upbeat position, and switch 9 when the pedal 4 is at its downbeat location. The particular position of the pedal 4 to actuate such switches is controlled by turn screw and lever assemblies 10 and 11 (FIG. 3) which extend between the pedal support structure cover 14 and switches 8 and 9 to provide for the variation of the travel distance between arms 18 and 19 and switches 8 and 9. Switches 8 and 9 are connected in parallel with a source of electric power such as conventional A-C line outlet 60, (FIG. 1). Accordingly, switching means 9 will close to provide an electrical output signal when the foot 21 for the particular student has reached its particular downbeat position. Similarly, switch 8 will close to produce an electrical output signal when the student's foot has reached its particular upbeat position. A readout device 3 is adapted to complete the circuit for the power source through the switches 8 and 9. The readout device 3 contains an upwardly positioned lamp 6 of one color, such as white, in series with switch 8 to flash on the upbeat, and another lamp 7 of a different color, such as red, in series with switch 9 to flash on the downbeat. The lamps 6 and 7 are mounted inside a housing 24 which has a window 25 for emitting the light from lamp 6 when illuminated, and a second window 26 spaced from the first window for emitting the light from lamp 7 when illuminated. The housing 24 has a hook member 38 adjacent the top end for mounting the readout device 3 on a music stand 22 adjacent the written music 23. By the foregoing arrangement, a flashing light, indicative of the time for playing of an upbeat or downbeat, is flashed from corresponding up and down locations adjacent the sheet music upon which the symbols for playing such beats are located. By such arrangement, a learning device is provided which is enjoyable to use and which increases the speed of analysis and learning of playing of a beat in proper time to the written music.

The foot pedal support structure 5 (FIG. 2) provides the mounting for the foot pedal 4 and comprises the means to translate the upbeat and downbeat locations of the pedal into electrical output signals. The support structure 5 (FIG. 4) is of a 2-piece construction, having a cover member 14 on which the pedal 4 is mounted, and a base member 13 on which the cover member 14 rests to provide a hollow interior space for containment of the signal producing mechanism. The base member 13 is made of metal or a sturdy plastic and has a bottom 27 from which (FIG. 2) end walls 32 and 33 and side walls 34 and 35 project upwardly for receiving the cover member 14. Side wall 34 supports the sockets for receiving the power input jack 121 and the output jack 123 to convey the output signals to the readout device 3. When assembled, the base 13 and cover 14 are held together by a bolt 80 (FIG. 4) which threads into internally threaded sleeve 81 welded to the bottom surface 14a of the cover 14.

The cover member 14 is made of a sturdy material such as metal or the like for supporting the swivel means 12 on the top side thereof and for dependingly supporting the switching means 8 and 9 from the bottom side 14a thereof. On top of the member 14 is a cushioning member 28 made of rubber or the like for providing for a soft contact surface for the foot pedal 4 when on its downbeat.

Pedal 4 is mounted on the cover 14 by a swivel member 12 to provide for 360 degree rotation of the pedal 4, as well as to provide a passageway for upward and downward movement of the pedal position follower pin 15 for actuating switches 8 and 9, as hereinafter described. The swivel member 12 has a U-shaped base 40 (FIG. 5) mounted for rotational movement on the cover member 14. The U-shaped base 40 is mounted on a first washer 44 and secured in place by a bolt 41 which projects through an aperture 39 in the cover member 14, and is secured by a second washer 45 and nut 42 disposed below the bottom surface 14a of cover 14.

Figure 5:
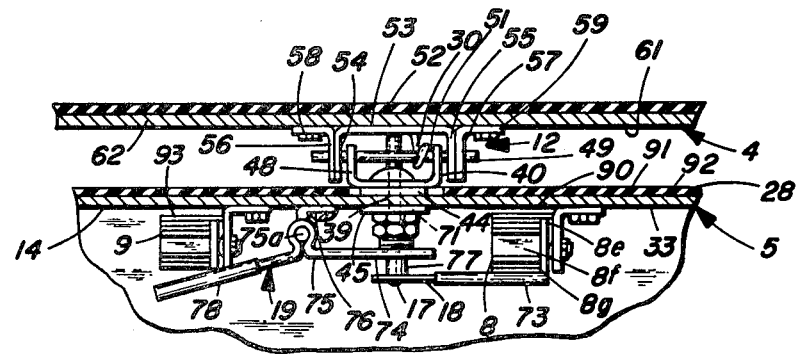
FIG. 5 is a fragmentary partially broken away end elevation view of the foot pedal device.
Figures 6, 7:
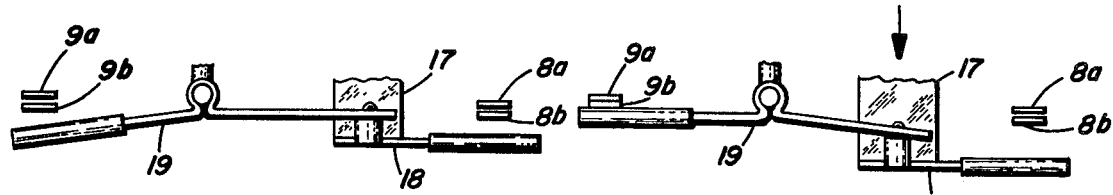
FIG. 6 is a schematic illustration of switch actuating arms in the neutral position.
FIG. 7 is a schematic view of the switch actuating arm for the downbeat position closing the associated switch contact.
Figure 8:
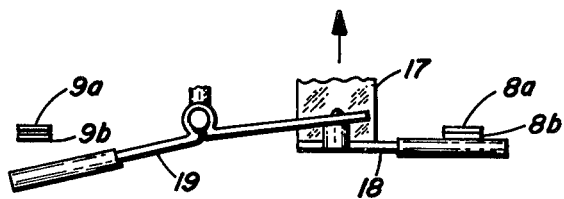
FIG. 8 is a schematic view of the upbeat switch actuating arm closing the associated switch.

The pedal 4 is hingeably mounted for vertical pivotal movement on the U-shaped base 40 of the swivel member 12 (FIG. 5). Swivel base 40 carries a hinge pin 51 spanning side plates 48 and 49. An inverted U-shaped bracket 52 has a pair of depending legs pivotally mounted on the hinge pin 51, with a connecting web 53 engaging the bottom surface 61 of the pedal base 62. Inverted U-shaped bracket 52 is secured to the pedal 4 and hinge pin 51 by angle brackets 56 and 57 which are attached to the foot pedal base member 62 by screws 58 and 59. As shown, the angle brackets 56 and 57 are pivotally mounted on the pivot pin 51 laterally of inverted bracket 52 to hold bracket 52 in place. The pedal 4 is spring biased for upward movement by spring 30 which is coiled at one end about hinge pin 51, and at the other end engages the under surface of the web 53 of inverted U-bracket 52. By such arrangement, the pedal pivots downwardly in response to foot pressure and upwardly upon removal of such pressure.

Switch actuation means (FIG. 3) are mounted on the pedal support structure 5 to actuate the switching means 8 and 9, in coordination with the location of the pedal 4. The switch actuation means includes a follower pin 15 (FIG. 4) a return spring 17, and actuating arms 18 and 19. The return spring 17 is made of spring metal and has a generally Z-shape defined by an upper leg and a lower leg separated by a connecting web. The upper leg is secured to the cover member 14 such as by screw 72. The lower leg of return spring 17 supports and responds to follower pin 15 which is of a diameter to move freely in passageway 71 in the bolt means 41. The pin 15 is of such length that when the spring 17 is in its relaxed, or upwardmost position, the pedal 4 is at a height at least as great as the maximum height to which the foot of the user would be raised. In operation, when the pedal 4 is depressed, the follower pin 15 moves the spring 17 downward. Correspondingly, when the foot pressure on the pedal 4 is released, the foot pedal is urged upwardly by the spring 30, with spring 17 similarly urging the follower pin 15 upwards.

Figure 4:
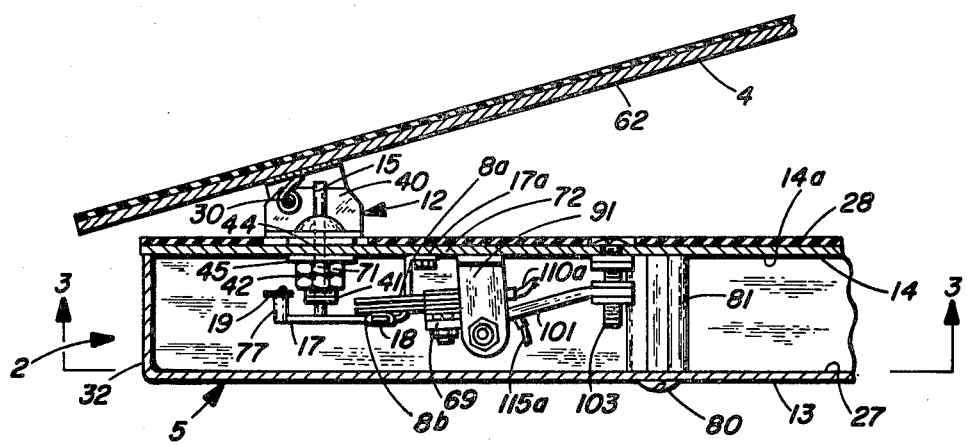
FIG. 4 is a fragmentary partially broken away side elevation sectional view of the foot pedal device.
Figure 3:
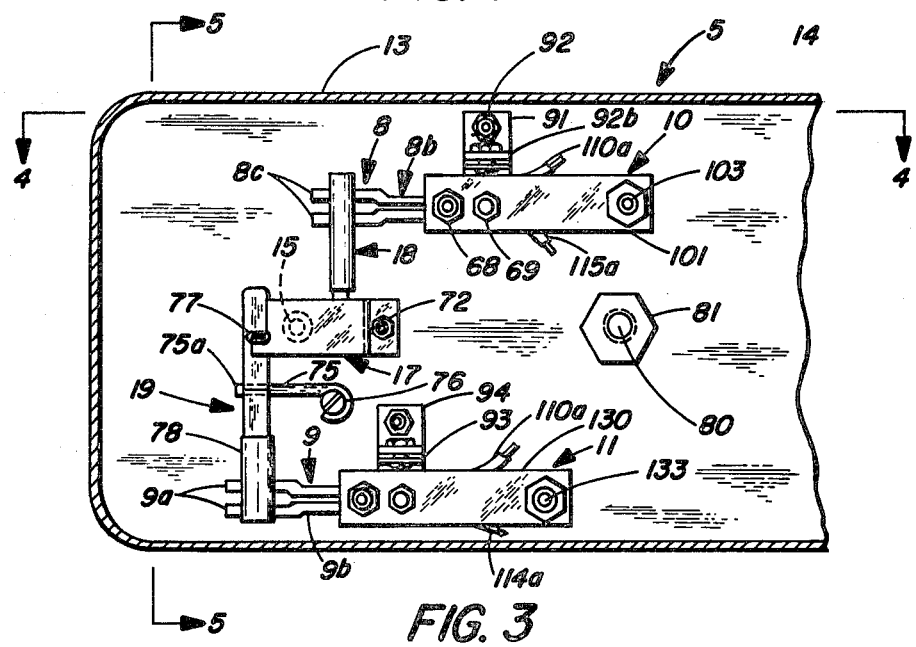
FIG. 3 is a bottom plan partially broken away sectional view of the foot pedal device taken along the lines 3—3 in FIG. 4.

Arm and linkage means operably connected to the spring 17 provide the mechanical means for opening and closing the switches 8 and 9 in response to the movement of spring 17. As shown in FIGS. 3, 4 and 5, an arm 18 is fixedly cantilevered from one side of the spring 17 to move in the same direction as the spring to close switch 8 when spring 17 moves upwards for an "upbeat". Arm 18 is attached at one end as by solder or the like, to the spring 17, and at the other end carries an outer sleeve 73 of electrical insulation material adapted to engage and close the "up" switch 8 when arm 18 moves upwards a predetermined amount.

A rocker arm assembly, shown generally at 19, provides the means for closing the "down" switching means 9 when spring 17 and thus pedal 4 is moving downwards. The rocker arm 19 is pivotally suspended from the cover 14 by a staggered Z-shape bracket 75, which is secured to the cover 14 as by a fastener 76 which passes through the upper foot of the bracket 75. A horizontally extending, circular in cross section, leg 75a projects outwardly from a depending leg portion of bracket 75 to provide a pivot point for the rocker arm 19. The rocker arm member 74 has a semi-closed loop portion disposed intermediate its length to encompass the pin 75a to provide for the pivotal rocking movement of the arm 19. At one end, the rocker arm member 74 has a depending boss 77 which is pivotally connected by a wire or the like to the spring 17 so that movement of the spring 17 causes corresponding movement of arm 19. The arm 19 has a sleeve 78 of insulating material for mechanical contact with the switch 9.

Normally open switching means 8 and 9 are alternatingly urged closed by arms 18 and 19 to switch on the respective lamps 6 and 7 in response to the selected position of the foot pedal 4. Switching means 8 includes a pair of normally spaced apart spring metal contacts 8a and 8b connected in series circuit between lamp 6 and the source of power. For example, one end of contact 8a is connected to lamp 6, and one end of contact 8b is connected to the power source to cause flow of current through the lamp 6 to turn it "on" whenever the contacts 8a and 8b are closed by the mechanical pressure of arm 18 when the upbeat is reached by pedal 4. Each contact 8a and 8b is generally U-shaped with fork-like prongs such as 8c at the end of the contacts. The contact members 8a and 8b are sandwiched between a central insulator 8f and two other insulators 8e and 8g, with the prongs of contacts 8a and 8b cantilevered out from the insulators whereby the prongs can be urged into contact when contact 8b is engaged by arm 18. The contact assembly is held together by a bolt and nut assemblies 68 and 69. The contact assembly is attached to the foot pedal support structure 5 by being suspended from a spring metal L bracket 90 which, in turn, is attached to angle bracket 91 as by fastener 93. Angle bracket 91 is fastened at its top end as by a fastener 92 to the cover 14.

Switching means 9 is identical in construction and mounting to means 8 with corresponding parts having the same letter suffices. The mounting of the switch assembly 9 to the cover 14 is by corresponding spring metal L-bracket 93 and support bracket 94. Switching means 9 is connected electrically in parallel with switch 8, but in series between the power source and lamp 7, whereby the closing of switch 9 by arm 19 lights lamp 7 when the pedal 4 is on the downbeat.

Figure 9:
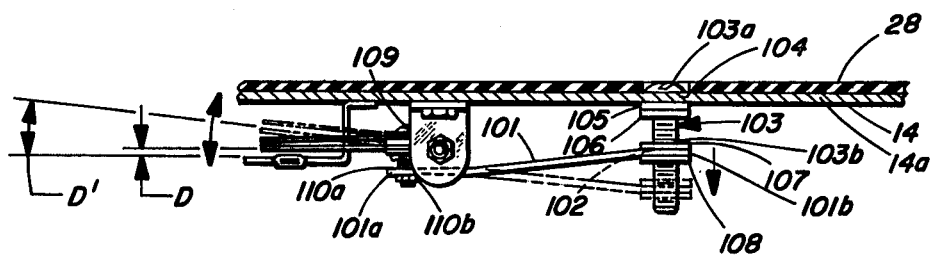
FIG. 9 is a fragmentary, enlarged sectional view of a portion of the device illustrated in FIG. 4.

Adjustment means shown generally at 10 and 11 (FIG. 3) is provided for adjusting the travel distance between respective switch actuating arms 18 and 19 and respective contacts 8 and 9 and thus for adjusting the upbeat flash of lamp 6 and the downbeat flash of lamp 7 to the selected location of the foot pedal 4 which is natural to the particular student. As an example, the adjustment means for switch 8 is shown in FIG. 9. The adjustment means for switch 8 includes a lever arm 101 mounted at one end for vertical up and down movement on a turn screw 103, and at the other end attached to the switch assembly 8. The turn screw 103 is mounted in depending relationship from the cover 14 by the head 103a being disposed on the top side of cover 14, with the shaft 103b passing through cover member aperture 104 and secured in place for rotational movement by washer 105, and nut 106. One end 101b of lever arm 101 has an aperture 102 for receiving screw shank 103b and internally threaded nuts 107 and 108, with the threads of the nuts mating with threads of shank 103b, whereby turning of the screw 103 will cause the end portion 101b of the lever arm 101 to move upwardly or downwardly depending on the direction of rotation of the screw 103. The other end 101a of the lever arm 101 is attached to the switch means as by nuts 110a and 110b and bolt 109 arrangement. Since the switch 8 is suspended from spring metal bracket 90, downward movement of the lever arm 101 will cause a bending of spring metal bracket 90 and corresponding downward positioning of the switching means 8, whereas upward movement of the arm 101 will result in corresponding upward movement thereof. Accordingly, the spacing between the lowermost contact 8b and the insulated sleeve 73 of arm 18, such as the distance D, can be varied such as shown in phantom line to the distance D', to correlate the closing of switch 8 with the selected downbeat position of the pedal 4.

By turn screw 133 and lever arm 130 (FIG. 3) the position of switch 9 may be adjusted relative to switch actuating arm 19 by the coaction of corresponding parts to those described in connection with the operation of arm 101 for adjusting switch 8.

Figure 2:
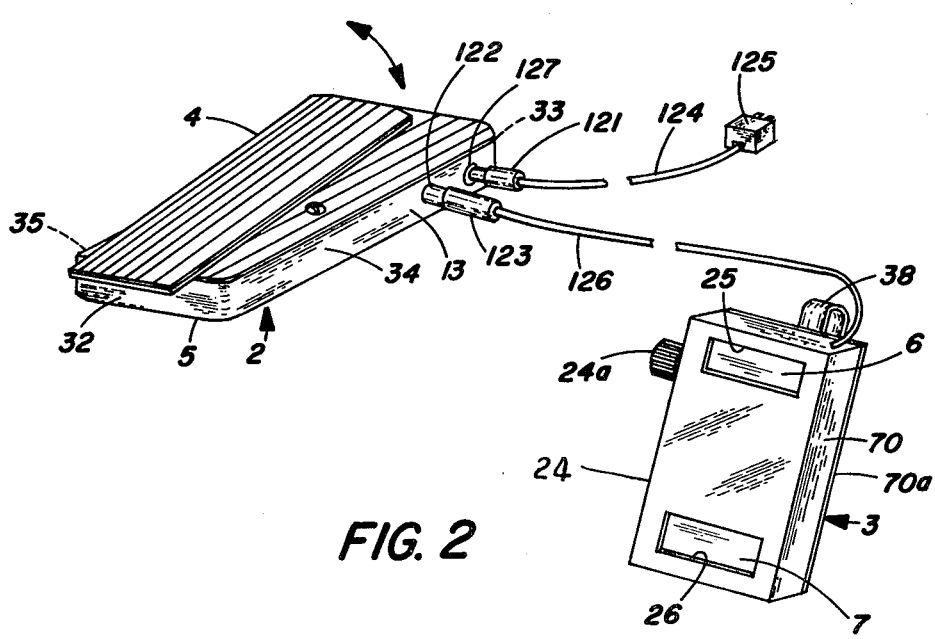
FIG. 2 is a generally perspective view of the device.
Figure 10:
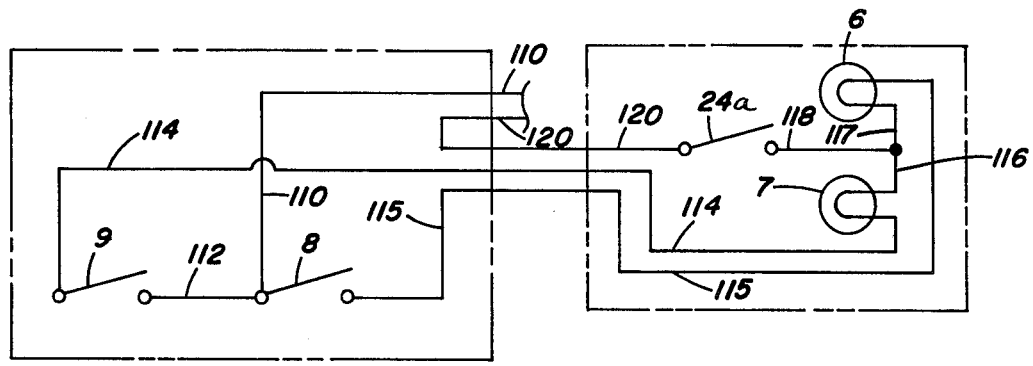
FIG. 10 is an electrical schematic wiring diagram illustrating one typical circuit that may be employed with the present invention.

A schematic of the electrical system is shown in FIG. 10. Switch 24 connects the lamps 6 and 7 in circuit with power lines 110 and 120 and switches 8 and 9. The alternating opening and closing of switches 8 and 9 at the selected positions of the foot pedal 4 correspondingly illuminate or extinguish lamps 6 and 7. For example, assuming that switch 24 is closed, the current flow to light lamp 6, when switch 8 is closed, is by lines 110, 115, 117, 118 and 120. Similarly, the circuit for lighting lamp 7 when switch 9 is closed is by conductors 110, 112, 114, 116, 118 and 120. The wiring may be a suitable insulated conduit, such as cable 110a (FIG. 3) which is connected to contact 8a to provide the current input to the switch from the power source and cable 115a connected to contact 8b to provide for the current flow through the switch 8 to the light 6 when contacts 8a and 8b are closed. Similarly cable 110a and 114a respectively provide the input to switch 9 from the power supply and the output of the switch to the lamp 7 when contacts 9a and 9b are closed. Any suitable power supply can be used. For example, the device is shown as using AC line current. In such case, the power lines 110 and 120 can be connected to a conventional receptacle 127 (FIG. 2) disposed in the base member 13. Connection from the receptacle 127 to the conventional AC 110 volt line is then made by a conventional jack means 121, cable 124, step-down transformer and plug 125 connected to an electrical wall outlet 60. Similarly, the lines 114 and 115 leading from the respective switches 9 and 8 to the lamps 7 and 6 can be by way of a receptacle 122 disposed in the wall of the base member 13, through a conventional jack means 123 then by cable 126 to provide the input lines 114 and 115 to the readout device 3. Return line 120 is also carried by cable 126 between the readout device and receptacle 122. A connector means (not shown) connects the receptacle 122 with receptacle 127 to complete the circuit. Switching means 24a (FIG. 10) could be a suitable "on" "off" switch known in the art and activated by a suitable means, such as knob 24a (FIG. 2).

The readout device is preferably a box-like container having a housing 70 having a removable rear cover 70a. A lamp 6 of one color, such as white, is mounted at one end of the device, such as by the lamp being placed in a suitable receptacle (not shown), which is soldered to one compartment (not shown) in the box. A window, such as 25, opposite the light, preferably of an elongated rectangular shape, provides the visual indication of the lighted white light when it is illuminated. A lamp 7 of another color, such as red, is similarly mounted in a conventional socket (not shown) in a compartment (not shown) adjacent the other end of the container. An elongated, preferably rectangular, window 26 in the cover provides for the outlet of the illumination of the second lamp. A physical divider means (not shown) may be placed between the lamps so that a flashing light from one lamp will be observed only out of its respective window. A rotatable switch, such as 24a, may be mounted in the device in a way known in the art in series between the power supply return and the two lamps which in turn are connected in parallel as previously explained. Mounting means, such as hook 38, is provided for mounting the device on a music stand 22 adjacent to the music 23.

OPERATION

In operation, the student first connects the device to a suitable source of power, such as by inserting jack 121 (FIG. 2) in receptacle 127 and inserting plug 125 into the wall socket 60 (FIG. 1). The jack 123 is plugged into socket 122 and switch 24a is turned "on". The readout device 3 is placed on the music stand 22 adjacent the music 23. The pedal 4 is then adjusted by swivel means 12 (FIG. 4) so that it is properly aligned for the type of foot movement for keeping time which is natural to the musician. For example, if the musician uses the conventional toe tapping method, the pedal would be positioned as shown in FIGS. 1 and 2. If the musician uses the heel tapping method, the pedal would be swiveled 180 degrees. If the musician uses the side of his foot, the pedal would be rotated 90° to the position shown in FIG. 2, to the right or left side, depending on which side of the foot the musician rocks in order to keep time. Next, the musician determines his natural degree of foot movement in keeping time. For example, if in his downbeat he puts his foot all the way down until he feels contact, he would turn the adjusting screw 133 for the switch 9 until red light 7 flashes through window 26 on the readout device 3 when the foot pedal 4 is at such lowermost position. If the musician keeps a downbeat without making such physical contact, he would move his foot down the degree which is natural for him, and then while holding the foot at such position, adjust the screw 133 until the light 7 flashes. This will then be his "down" position thereafter.

The student similarly will then move his foot upward to what is his ordinary uppermost position when making an "upbeat". Holding his foot in such position, he will then adjust screw 103 until arm 18 moves a sufficient distance to close switch 8 to light upbeat lamp 6 in window 25.

The device is now in a position for use when playing music. Prior to using the device, the student will properly divide each sheet music measure into the proper number of beats and mark where each note comes on the music relative to an upbeat, as is well known in the art. The student will then proceed to play the notes while keeping time with his foot in the conventional fashion. However, because the present device is correlated to such foot movement, one light will flash on an upbeat, such as the white lamp 6, and the other lamp, such as red lamp 7, will flash on the downbeat. If the musician is playing correctly, the upbeat flash will occur at the instant when the musician is playing an "upbeat" note, and each downbeat note will occur when the musician is playing a note at the "downbeat". For further orientation assistance, the upbeat light is disposed "above" the downbeat light, so that an "up" and "down" correlation is established between such beats and the physical location of the lights.

If the student is playing his note too soon or too late relative to an upbeat, for example, it will immediately become apparent. The student would then repeat the measure playing his note slightly sooner, if the note was played after the time interval at which it should have been played to be an upbeat. Similarly, he would play the note later if he had previously played the note too soon prior to the upbeat.

In order to still further enhance the learning process, the musician could use a color coding on the sheet music to correlate the beats of the music with the color of light which he will be observing. For example, all downbeats could be marked R, corresponding to the red light flash. All upbeats could be marked W corresponding to the white light flash. As a result, the eye coordination between seeing a symbol representing a color and seeing the flash of the color provides for much more rapid reading of the music and correlation with the visual image which he has seen. In other words, when he "sees" the letter R, he should simultaneously "see" the flashing red light. By such arrangement, not only is the speed of learning enhanced, but it is easier to check the progress and accuracy of playing.

I claim:

1. A device for learning and practicing a musical beat comprising foot pedal support means,
   a foot pedal pivotally mounted on said support means, signal producing means for producing an electric signal in response to a position of the foot pedal when it is at a downward position, and another electric signal in response to a position of the foot pedal when it is at an upward position,
   a visual readout means for producing a visual signal in response to said first mentioned electric signal, and
   another visual signal in response to said other electric signal.

2. A device in accordance with claim 1, wherein
   said readout means has attachment means adapted to position the device adjacent a location for written music.

3. A device in accordance with claim 1, wherein the foot pedal position to produce at least one of said signals is selectable.

4. A device in accordance with claim 3, wherein the upward position of the foot pedal is selectable.

5. A device in accordance with claim 1, wherein
   said foot pedal is also rotatably mounted on said base whereby the pedal can be selectively actuated by a plurality of parts of the foot of a user.

6. A device in accordance with claim 1, wherein
   said signal producing means includes switch actuating means mechanically responsive to the position of the pedal,
   electric switch means adapted to be actuated by said switch actuating means to produce said first mentioned electric signal when said pedal is in a predetermined downward position and
   another electric switch means adapted to be actuated by said switch actuating means to produce said other electric signal when said pedal is in a predetermined upward position.

7. A device in accordance with claim 6, wherein
   said switch actuating means includes a means to move a distance responsive to the downward movement of said pedal to actuate said first mentioned switching means, and
   other means to move a distance responsive to the upward movement of said pedal to activate said second switching means.

8. A device in accordance with claim 7, wherein at least one of said distances is selectively adjustable.

9. A device in accordance with claim 8, wherein said switch actuating means mechanically responsive to the position of said pedal includes a spring biased follower means adapted to move codirectionally with the movement of the pedal, and a switch closing means operably connected to close the first mentioned switch when said follower means moves in one direction, and other switch closing means operably connected to close said other switch when said follower means moves in the opposite direction.

10. A device in accordance with claim 6, wherein at least one of said switch means is adapted to open before the other of said switching means closes.

11. A device in accordance with claim 1, wherein said first mentioned visual signal is of a different color than said second mentioned visual signal.

12. A device in accordance with claim 1, wherein the visual signal in response to the upward movement of the pedal is positioned upwardly of the visual signal for the downward movement.

* * * * *